Jan. 2, 1968  M. L. HANSON ET AL  3,361,964
FLAW DETECTING APPARATUS HAVING A MEANS FOR
SCANNING THE CORE OF A CYLINDRICAL MEMBER
Filed June 27, 1963  2 Sheets-Sheet 2
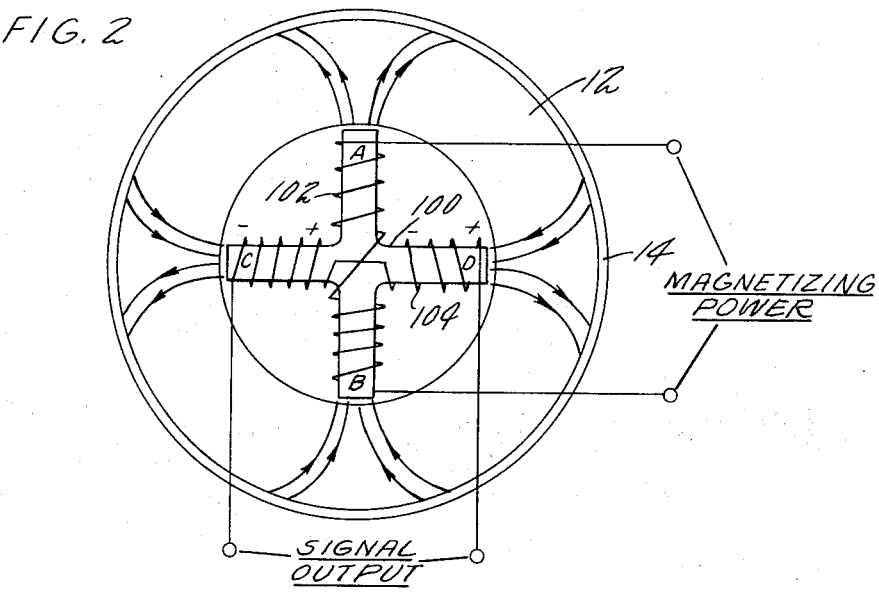
FIG. 2
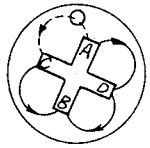 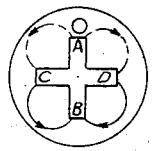 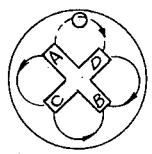 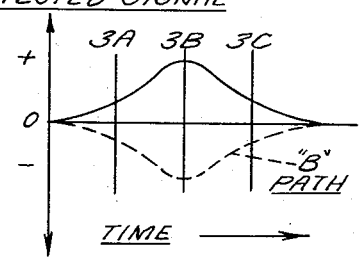
FIG. 3A  FIG. 3B  FIG. 3C  FIG. 4A
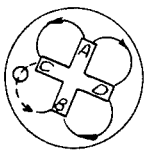 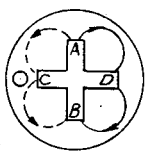 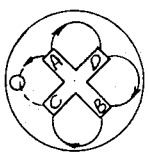 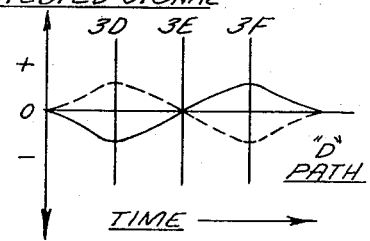
FIG. 3D  FIG. 3E  FIG. 3F  FIG. 4B
INVENTORS
MERLYN L. HANSON
HERMANN ZIERMANN
BY Donald X. Bradley
AGENT

United States Patent Office 3,361,964
Patented Jan. 2, 1968

3,361,964
FLAW DETECTING APPARATUS HAVING A MEANS FOR SCANNING THE CORE OF A CYLINDRICAL MEMBER
Merlyn L. Hanson, Springfield, Mass., and Hermann Ziermann, Cheshire, Conn., assignors to United Aircraft Corporation, East Hartford, Conn., a corporation of Delaware
Filed June 27, 1963, Ser. No. 291,122
5 Claims. (Cl. 324—61)

This invention relates to non-destructive testing apparatus, and particularly to dielectric and electromagnetic apparatus, for determining the presence of flaws in materials. The testing techniques and apparatus have been developed specifically for use with large solid propellant rocket motors, but need not be limited thereto.

Non-destructive testing techniques for determining the presence of flaws and discontinuities in materials have advanced considerably in recent years. However, none of the present techniques meet the demands imposed by very large solid boosters, and the development of new test methods becomes necessary.

For proper burning of the solid rocket propellant it is necessary that the grain be free of cracks, soft spongy areas and voids. Any defect in the propellant grain will radically affect the rate of burning of a propellant and consequently the time of burning, the termperature and the thrust developed by the rocket. Consequently, for proper performance of the solid propellant rockets, it is essential that those defects in a large rocket motor which may cause malfunction during motor operation be detected. When such faults are detected, the faults may be corrected or the particular propellant grain may be discarded.

While rocket propellant grains vary somewhat in their chemical composition, in general the propellant grains are composed mainly of active ingredients such as ammonium perchlorate imbedded in an inert binder material. After curing, the propellant is in the form of a viscoelastic solid which in many respects is similar to rubber. The propellant grain, which is usually quite large, is encircled with three smaller concentric layers of materials, specifically a liner of inert propellant material, a layer of thermal insulation, usually rubber, and a case which is generally of steel, but which may be of Fiberglas. The propellant grain geometry is normally cylindrical, but some grains are star shaped or otherwise segmented. Propellants also come in different chemical types, the most common being polyurethane and PBaN.

Propellant grains are frequently formed in the shape of a thick-walled tube, that is, the grain has a cylindrical void along its axis. This invention takes advantage of the centrally located cylindrical void in the propellant material, and the chemical composition of the grain. Sensing apparatus is positioned in the center of the core area. In one embodiment the cylindrical conductor is positioned in the center of the core, and a potential is applied between the outer steel case and the inner conductor. The conductor and the steel case form a coaxial capacitor. If the cylindrical conductor is rotated, the entire grain area of the propellant may be scanned, and current changes across the capacitor due to changes in the dielectric constant of the grain material caused by voids, cracks or discontinuities in the grain may be sensed. Another form of the invention utilizes a cruciform iron core rotating within the central core area of the grain. Magnetizing coils wound on opposed poles of the iron core create lines of flux whose paths include a portion of the steel case. Detection coils wound on the core respond to unbalances in the magnetic flux through the grain caused by flaws in the grain.

It is therefore an object of this invention to provide a novel non-destructive testing system and apparatus.

Another object of this invention is a novel non-destructive testing system and apparatus for solid rocket propellant grains.

A further object of this invention is a dielectric scanning system for obtaining information as to the position of voids and cracks in solid rocket propellant grains.

Another object of this invention is an electromagnetic scanning system for obtaining information as to the position of voids and cracks in solid rocket propellant grains.

A further object of this invention is a novel dielectric scanning system for solid rocket propellant grains in which variations in the dielectric constant of the grain caused by cracks or voids in the grain produces a detectable variation in an alternating current impressed between the outer steel case of the propellant and a cylindrical conductor inserted in the central core area of the propellant grain.

Another object of this invention is a novel electromagnetic scanning system for solid rocket propellant grains in which an electromagnetic flux is generated through the grain material, and variations in the flux caused by voids or cracks in the grain are sensed by a detector coil in the central core area of the propellant grain.

A further object of this invention is a novel non-destructive testing apparatus for solid rocket propellant grains in which rotating testing apparatus is positioned in the central core area of the grain, and the entire area of the grain is scanned to provide position information.

Other objects and a fuller understanding of this invention may be had by referring to the following description and claims, read in conjunction with the accompanying drawings, in which:

FIGURE 2 is an embodiment of the electromagnetic scanning apparatus showing the coil configuration and the flux paths;

FIGURE 3 shows the variation in the flux intensity due to flaws in the grain; and FIGURE 4 shows the resultant potential which appears as the electromagnetic transducer scans past a flaw if that potential is produced by a synchronous detector operating upon the signal output.

Figure 1:
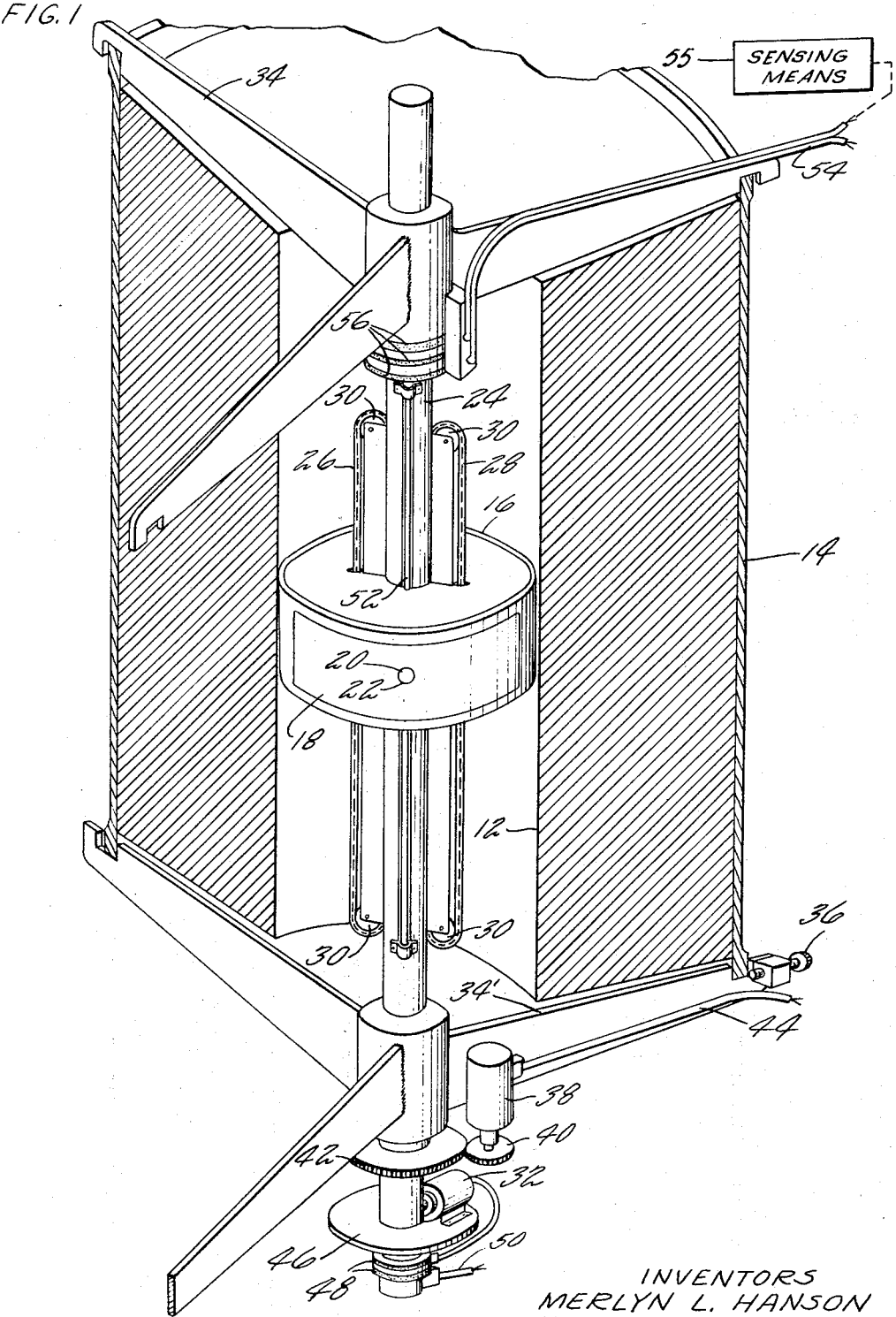
FIGURE 1 shows the preferred embodiment of the dielectric scanning apparatus inserted in the central core area of the propellant grain.

Referring now to FIGURE 1, a typical solid fuel rocket has a grain material 12 which is approximately 8' in diameter. Surrounding the outside of the grain is a steel case 14 having a thickness of approximately ⅓ to ½ inch. While not shown, immediately inside the steel case 14 is a layer of thermal insulation, usually being of rubber and having the thickness of approximately ¼ inch. Between the thermal insulation and the grain 12 is a liner having a thin layer of inert propellant. The propellant grain 12 is a colloidal-suspension, cross-linked-matrix material. The primary ingredients in the propellant are NH$_4$CLO$_4$, aluminum particles, and PBAN (polybutyl acrylonitrile), the remainder of the propellant being composed of very small percentages of other miscellaneous compounds.

Inserted in the central core area of the propellant is a cylindrical structure 16 which extends completely around the inner circumference of the propellant grain. Structure 16 may be composed of any relatively rigid material, but is preferably of insulating material. A conductor material 18 is plated upon or otherwise forms a section of structure 16. As will become apparent, the object of conductor 18 is to produce an electrostatic field between the conductor 18 and the metal case 14. Any known method of forming a conducting section 18 on or in the structure 16 may be used, including plating or other deposition methods.

A small detector segment 20, preferably circular in form, is located in an opening in conductor 18. That opening is near the center of conductor 18 and is only slightly larger than segment 20 so that the conducting surfaces of conductor 18 and segment 20 are separated by only a very small air gap or a thin ring of insulating material. By that means, and by means of the non-conducting structure 16, detector segment 20 is electrically insulated from conductor 18. A layer of insulation 22 is shown between detector segment 20 and conductor 18, although it is obvious that if the conductor 18 and detector segment 20 are deposited upon structure 16, without being in contact with each other and if structure 16 is composed of an insulating material, insulating material 22 will actually be a portion of structure 16.

Structure 16 is mounted on a shaft 24 for vertical movement relative to shaft 24. Structure 16 is driven in a vertical direction along shaft 24 by chains 26 and 28, the chains being mounted on sprockets 30. The chain and sprockets are driven by means of a motor 32 connected to the chain and sprockets by means not shown which run through shaft 24. Shaft 24 is mounted for rotation by spiders 34 and 34′, the spiders having bearings therein on which the shaft rotates. The spiders are fixedly attached to the top and bottom portions of the case. The spiders may be attached to and aligned with the case 14 by means of thumb screws 36. The entire shaft 24 including the structure 16 is rotated within the spiders by means of a motor 38. Motor 38 drives pinion gear 40, which in turn drives gear 42. Gear 42 is fixedly connected with the shaft 24. Motor 38 is energized by means of a source of AC power through line 44. Motor 32 is connected with platform 46, the platform also being attached to shaft 24 for rotation therewith. Motor 32 is energized by means of slip rings 48 which receive their power from line 50. AC voltage, for purposes to be described, is transmitted to structure 16 and applied to conductor 18 and detector segment 20 by means of conductors 52 which conduct the voltage from AC line 54 through slip rings 56.

As thus described, structure 16 is rotated with shaft 24 by motor 40, and the structure 16 including the conductor portion 18 and the detector segment 20 is driven in a vertical direction by means of motor 32 through chains 26 and 28. In this way the structure 16 is rotated in a helical manner, to thus scan the entire grain of the propellant. The structure 16 is of such a diameter as to match as closely as possible the inside diameter of the propellant without either the detector segment 20 or the conductor 18 touching the propellant.

An alternating potential is applied between the case and detector segment 20 and also between the case and conductor 18 by means of contacts, not shown, which run from conductor 52 inside of the structure 16. Detector segment 20 and conductor 18 will always be at the same instantaneous potential, although the detector segment is electrically insulated from the conductor 18. The steel case 14 may be grounded. Flux lines are thus generated between the case 14 and the conducting portions 18 and 20. Since conductor 18 is a coaxial segment very much larger in area than segment 20, edge effects are not apparent in that portion of the field normal to the surface of segment 20. Those flux lines impinging on the small insulated segment 20 traverse a straight path through a slightly conical section of small cross-sectional area between the segment 20 and the case 14.

If the potential applied between case 14 and conductors 18 and 20 is a high frequency AC voltage, for example, a potential of 50 volts at about one megacycle, the displacement current to the small segment 20 may be measured with a sensitive AC recording microammeter. The flux lines impinging on the detector segment 20 pass through a very small cross section of the propellant. By rotating the inner conductor and simultaneously plotting the AC current through the detector segment 20 on a strip-chart recorder, any deviations from the base line will be recorded when the segment scans an area of the propellant where the flux concentration is affected by the presence of a flaw, crack or discontinuity.

The steel case 14 and the conducting sections 18 and 20 act as a coaxial capacitor. The number and concentration of flux lines across this capacitor is a function of the dielectric constant of the material between the plates of the capacitor. By utilizing a high frequency AC voltage, variations in the current flow across the plates of the capacitor may be sensed by sensing means shown in block 55 connected to AC supply line 54. Flaws in the propellant will have a different dielectric constant than the propellant itself. Consequently, when the flux lines which impinge upon detector segment 20 also pass through a flaw, the capacitance between the plates, and therefore the current between the plates, will change. The only requirement is that the propellant have a dielectric constant different from that of air, which is true of all known propellants.

Although a non-uniformity of the air gap between the detector segment 20 and the inner surface of the propellant will result in fluctuations of the recorded trace, such an effect can easily be distinguished from flaws and verified by visual or mechanical inspection methods. However, it is essential that the inner conductor not be in contact with the propellant, since noise may develop during the scanning operation which would interfere with the measurement of the signal.

Although it is not convenient with the apparatus disclosed to determine the radial distance of the flaw from the inner conductor, it is possible by this method to sense the presence and extent of the flaw, and consequently reject those propellants which have flaws in them greater than those allowable for proper operation of the propellant motors. Once a flaw is known to exist in the propellant, other known methods may be used to pinpoint the radial depth of the flaw if such information is desired.

The speed of scanning is limited only by such consideration as the amount of heat or electrical noise generated by the methanical system.

FIGURE 2 shows an embodiment of an electromagnetic scanning apparatus for determining the presence of flaws in the propellant. A cruciform iron core assembly 100 is mounted in a scanning assembly similar to that used with the dielectric flux system of FIGURE 1. The core has magnetizing coils 102 wound on two of the arms, arms A and B, diametrically opposed. A detection coil 104 is wound on the C and D arms, the winding being such that the detection coils are electrically opposed on each arm. A source of magnetizing power, not shown, is connected with magnetizing coil 102. The magnetic circuit is such that the AC magnetizing field induces equal and opposite voltages in the C and D coils when the propellant is homogeneous. As shown in FIGURE 2, the flux lines emanate from arm A and proceed through propellant 12 to case 14, where the lines then follow the case until they are adjacent arms C and D where the flux lines reenter the iron core to form a continuous path. Likewise, flux lines leave arms C and D, proceed through the propellant and the case, and return to the iron core through arm B. Equal and opposite voltages are produced across the detection coil 104 wound on arms C and D when there are no disturbances in any of the flux loops. Should there be any slight disturbance in one of the four flux loops, however, such as might occur when a void was present, the balance would be destroyed and a potential would appear at the terminals of the detection coil 104.

As shown in FIGURES 3 and 4, the greatest unbalance occurs when a flaw exists within the propellant volume included by an imaginary extension of the magnetizing poles. The iron core is rotated as is the dielectric flux scanner of FIGURE 1, and the rotational motion of the iron core can be synchronized with a recorder plot. Unique anomalies in the plot are produced by each of the four detection coils and magnetizing arms sweeping past a flaw area so that angular information may be derived from the shape and time of the resultant waveform.

FIGURES 3 and 4 show the resultant potential, rectified by a phase-sensitive demodulator (not shown), which would appear as the iron core transducer scanned past a flaw. The differences in flux are greatly exaggerated for clarity. FIGURES 3a, 3b, 3c, and 4a show the effect of the A arm rotating counterclockwise past a flaw. In FIGURE 3a, as the A arm approaches the flaw, the flux between the A and C arms is reduced. Consequently the voltage across detection coil 104 is unbalanced and a positive voltage is produced at the demodulator. This is shown graphically by the solid line in FIGURE 4a. In FIGURE 3b, the flaw is directly adjacent the A arm, and the flux from the A arm, which is sensed by both the C and D arms, is reduced. Because the detection coil is oppositely wound on the C and D arms, the voltage across the C and D detection coils will both increase in a positive direction. Consequently, a greater voltage than that of FIGURE 3a is produced, and is shown in FIGURE 4a. In FIGURE 3c, arm A has rotated past the flaw. In this case only the flux between the A and D arms is affected. The voltage across the detection coil 104 will still be positive, but will be of the same magnitude as that of FIGURE 3a. As also shown by the dashed line in FIGURE 4a, a flaw in the B path will produce the same result, except that the polarity of the output signal will be negative rather than positive.

FIGURES 3d, 3e, 3f, and 4b show the effect of the flux and the voltage for a flaw in the C path. In FIGURE 3d, the flaw is between the C and B arms, and produces a voltage of negative polarity with a magnitude as shown by the solid line in FIGURE 4b. Only the flux between the C and B paths is affected. In FIGURES 3e, arm C has moved so that the flaw is adjacent the C arm. In this case, the flux from the A arm to the C arm is reduced, and the flux from the C arm to the B arm is reduced. Because of the way the detector coil 104 is wound on arms C and D, the variation in flux across the C arm detector coil and consequently the voltage will be reduced to zero. This is shown graphically in FIGURE 4b. As the C arm is rotated further counterclockwise, as in FIGURE 3f, only the flux in the A to C path is reduced. This will result in a voltage as shown in FIGURE 4b similar to that of FIGURE 3a. The effect of a discontinuity or flaw in the D path is also shown by dotted lines in FIGURE 4b.

From the figures it is obvious that the angular location of the flaw may be determined with respect to the instantaneous attitude of the core by referring to the shape of the recorded signal fluctuation. While no information as to the radial location of the flaw would be generated by the configuration shown, once a flaw is known to exist in the propellant, its radial depth could be determined by other methods of inspection if such information is desired.

As in the dielectric scanning apparatus, the electromagnetic system is a very quick way of detecting the existence of a flaw whose exact position might then be resolved by other methods. The electromagnetic method depends on the propellant having a permeability other than 1.

While the invention has been described with a certain amount of particularity, it is obvious that numerous modifications may be made to the structure and operation without departing from the scope of the invention as hereinafter claimed.

We claim:

1. Non-destructive testing apparatus for determining the presence and location of flaws in a solid rocket propellant, said rocket propellant including a propellant material having a hollow core along its longitudinal axis, comprising:

a conductive case surrounding at least a portion of the outside perimeter of said propellant, a conductor plate positioned adjacent the inside circumference of said propellant material within said hollow core and extending laterally about a portion of said inside circumference, a detector composed of conducting material positioned upon said conductor plate, said detector being electrically insulated from said conductor plate, a source of alternating voltage having two terminals, means to connect one terminal of said source to said conductive case and the other terminal of said source to said conductor plate and to said detector whereby both said conductor plate and said detector are at the same potential, said alternating voltage producing a flux field through the portion of said propellant between said conductor plate and said conductive case, means for sensing flux variations in said flux field, and scanning means for rotating said conductor plate within said hollow core and for moving said conductor plate along the longitudinal axis of said propellant within said hollow core to thereby cause said flux field to scan the entire volume of said propellant.

2. Apparatus as in claim 1 in which said detector is positioned substantially within the center of said conductor plate.

3. Apparatus as in claim 1 and including a shaft inserted through said hollow core along the axis thereof, a member of insulating material attached to said shaft, means for mounting said conductor plate and said detector on said member, and means for rotating said member about said axis while said member is simultaneously moved along said shaft, said conductor plate and said detector thereby being moved helically within said propellant.

4. Apparatus as in claim 3 in which said conductor plate and said detector are deposited upon the surface of said member of insulating material.

5. Apparatus as in claim 1 in which said means for sensing flux variations in said flux field comprises means for sensing current variations in said alternating voltage source.

References Cited

UNITED STATES PATENTS

| 2,133,725 | 10/1938 | Sperry et al. | 324—64 |
|---|---|---|---|
| 2,583,546 | 1/1952 | Carlson. | |
| 8,849,675 | 8/1958 | Hall et al. | 324—61 |
| 2,772,393 | 11/1956 | Davis | 324—61 X |
| 3,048,775 | 8/1962 | Calvert | 324—61 |
| 3,152,302 | 10/1964 | Allen et al. | 324—40 X |
| 3,170,114 | 2/1965 | Placke | 324—40 X |
| 3,221,248 | 11/1965 | Batteau et al. | 324—61 X |

FOREIGN PATENTS

| 886,731 | 10/1943 | France. |
| 631,988 | 11/1949 | Great Britain. |
| 648,981 | 1/1951 | Great Britain. |

OTHER REFERENCES

Dayton et al.: Electronics, "Capacitive Micrometer," September 1946, pp. 106–111.

Revesz: Control Via Capacitance Measurement, "Instruments and Control Systems," July 1959, vol. 32, pp. 1038–1040.

RUDOLPH V. ROLINEC, *Primary Examiner.*

WALTER L. CARLSON, *Examiner.*

E. E. KUBASIEWICZ, *Assistant Examiner.*